(12) United States Patent
Fagnani et al.

(10) Patent No.: US 7,319,601 B2
(45) Date of Patent: Jan. 15, 2008

(54) STARTING CIRCUIT FOR SWITCHING POWER SUPPLIES

(75) Inventors: Mauro Fagnani, Nerviano (IT); Albino Pidutti, Udine (IT); Claudio Adragna, Monza (IT)

(73) Assignee: STMicroelectronics S.r.l., Agrate Brianza (MI) (IT)

(*) Notice: Subject to any disclaimer, the term of this patent is extended or adjusted under 35 U.S.C. 154(b) by 0 days.

(21) Appl. No.: 10/523,244

(22) PCT Filed: Jul. 19, 2002

(86) PCT No.: PCT/IT02/00478

§ 371 (c)(1),
(2), (4) Date: Sep. 23, 2005

(87) PCT Pub. No.: WO2004/010569

PCT Pub. Date: Jan. 29, 2004

(65) Prior Publication Data

US 2006/0152951 A1 Jul. 13, 2006

(51) Int. Cl.
  *H02M 1/36* (2006.01)
  *H02M 3/335* (2006.01)

(52) U.S. Cl. .................. 363/49; 363/21.08; 363/21.16

(58) Field of Classification Search ............. 363/21.08, 363/21.16, 97, 131, 49
See application file for complete search history.

(56) References Cited

U.S. PATENT DOCUMENTS

| | | | | |
|---|---|---|---|---|
| 5,359,281 A | * | 10/1994 | Barrow et al. | 323/284 |
| 5,459,652 A | * | 10/1995 | Faulk | 363/49 |
| 5,841,641 A | * | 11/1998 | Faulk | 363/21.14 |
| 5,909,363 A | * | 6/1999 | Yoon | 363/21.16 |
| 5,973,942 A | * | 10/1999 | Nelson et al. | 363/21.01 |

* cited by examiner

*Primary Examiner*—Gary L Laxton
(74) *Attorney, Agent, or Firm*—Lisa K. Jorgenson; Jose Gutman; Fleit Kain Gibbons Gutman Bongini & Bianco P.L.

(57) ABSTRACT

A bootstrap circuit for switching power supplies (SMPS), a switching power supply including a bootstrap circuit, and an integrated circuit of a switching power supply, are provided. The bootstrap circuit (13) for switching power supplies includes a first supply voltage (Vin) coming from a first terminal and a second supply voltage (Vcc) coming from a second terminal and a third terminal (30). The bootstrap circuit includes: a first current path between the first terminal and the third terminal (30); a second current path between the first terminal and the second terminal; a third current path between the second terminal and the third terminal (30); and a two-way voltage regulator (M3, Dz2, R5, R6) placed along the second current path.

9 Claims, 2 Drawing Sheets

STARTING CIRCUIT FOR SWITCHING POWER SUPPLIES

CROSS-REFERENCE TO RELATED APPLICATIONS

This application is the National Stage of International Application No. PCT/IT2002/000478 filed on Jul. 19, 2002, the entire disclosure of which is herein incorporated by reference.

BACKGROUND OF THE INVENTION

1. Field of the Invention

The present invention refers to a starting circuit for switching power supplies (SMPS), to a switching power supply comprising a starting circuit and to a switching power supply integrated circuit.

2. Description of Related Art

Most of the control integrated circuits for switching power supplies require for their starting a current to charge a capacity of the self supply circuit of the integrated circuit. Such current comes from the starting circuit or also known as the bootstrap circuit (start-up), constituted in the simplest case by a resistance connected to the supply line.

When the voltage on the capacity achieves a preset voltage value called start-up voltage, the control circuit is supplied by the self supply circuit. The self supply circuit is generally constituted by an additional winding performed on the main transformer of the switching power supply to which a suitable rectification and filtration circuit is connected.

Since lately there are more and more severe requests for the reduction of the supply consumption, the simple above mentioned resistance is replaced by circuits active during the starting phase and inactive during the normal operation.

Lately there are also demands to have some monolithic devices for the switching power supplies that comprise both the control circuit and the starting circuit (active).

However, the technologies used for these integrated circuits, for instance that denominated RESURF (REduced SURface Field), have limitations as regards the maximum sustainable voltage between source/body of the transistor DMOS and the substrate. The control of the charge present in the epitassial layer, necessary for the component sustainable voltage, does not allow to guarantee punch-through voltages higher than about 20V.

The realization of thick epitassial layers allows to increase the punch-trough voltage, but it has as result the complication of the industrial process and a cost increase.

Therefore, a need exists to overcome the problems with the prior art as discussed above.

SUMMARY OF THE INVENTION

In view of the state of the art described, it is an object of the present invention to provide a device, preferably monolithic, that eliminates the pressing voltage limitations of maximum supply voltage applicable to the device itself, that is realized with standard technologies, or without having to use new technologies and therefore through a low cost solution.

According to the present invention, such an object is achieved by a starting circuit for switching power supply having a first supply voltage coming from a first terminal and a second supply voltage coming from a second terminal and a third terminal; said starting circuit comprising: a first current path between said first terminal and said third terminal; a second current path between said first terminal and said second terminal; a third current path between said second terminal and said third terminal; characterized by further comprising a two-way voltage regulator placed along said second current path.

According to the present invention, such an object is also achieved by a switching power supply comprising a control circuit of said switching power supply; and a starting circuit of said control circuit according to the claim 1.

According to the present invention, such an object is further achieved by an integrated circuit of a switching power supply comprising a control circuit of said switching power supply; and a starting circuit according to the claim 1 able to sustain a self supply voltage greater than 40 V, more preferably greater than 80 V, and even more preferably greater than 160 V.

Thanks to the present invention it is possible to realize a two-way starting circuit that alternatively constitutes a path of low impedance that allows the passage of current from the main power supply toward the integrated circuit or to stabilize and to limit the maximum voltage applied to the inside circuits of the integrated circuit when it is fed by the auto supply circuit.

BRIEF DESCRIPTION OF THE DRAWINGS

The features and the advantages of the present invention will be made more evident by the following detailed description of a particular embodiment, illustrated as a non-limiting example in the annexed drawings, wherein.

DETAILED DESCRIPTION

Figure 1:
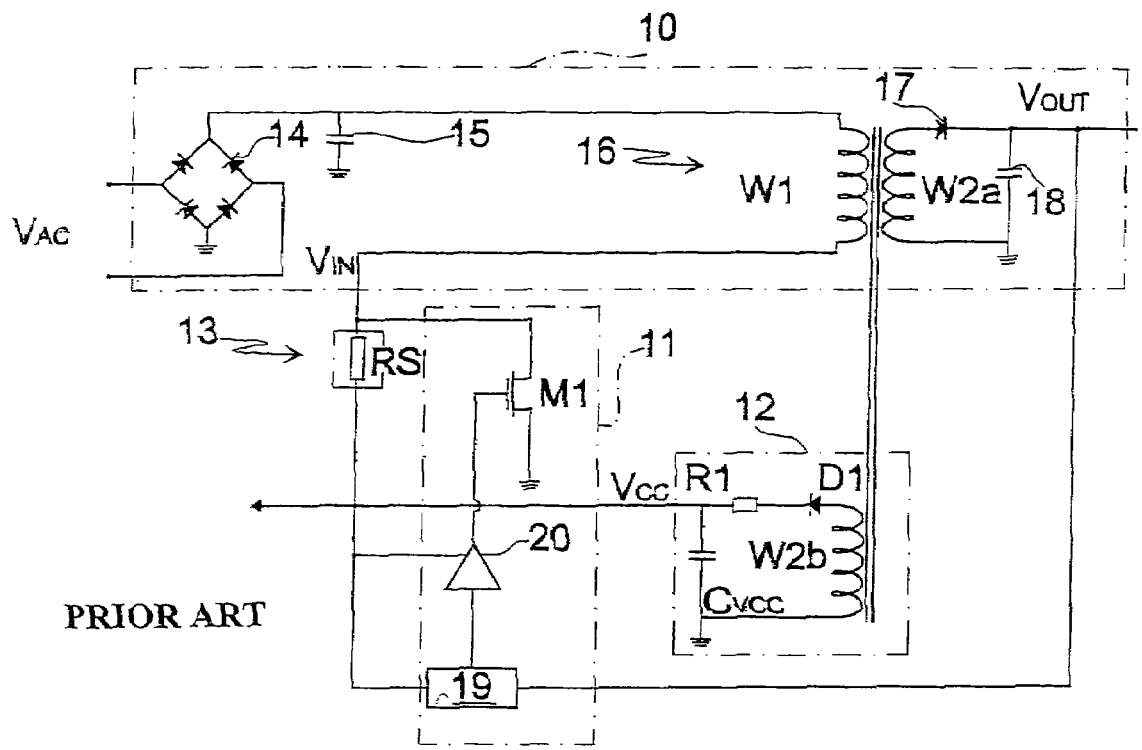
FIG. 1 shows a block scheme of a switching power supply comprising a starting circuit according to a first embodiment of the known art.

Referring now to FIG. 1, that shows a block scheme of a switching power supply comprising a starting circuit (or bootstrap circuit) 13 according to a first embodiment of the known art, a circuit 10 of rectification and filtration of the main supply, a self supply circuit 12 and a control circuit 11 of the circuit 10 of rectification and filtration of the main supply.

The circuit 10 of rectification and filtration of the main supply receives in input the supply voltage Vac of the power network, rectifies it through a diode bridge 14, filters it through a capacitor 15, and it provides it to the warm terminal of the primary winding W1 of a transformer 16. The secondary winding W2a of the transformer 16 provides the voltage present at its terminals to a rectifier diode 17 and to a filter capacitor 18. The circuit 10 provides the output voltage Vout to its output.

The control circuit 11, of the circuit 10 of rectification and filtration of the main supply, receives in input the output voltage Vout, this voltage is elaborated, in a known way, by an elaboration circuit 19, and provided to a driving circuit 20 of a power transistor M1 connected to the cold terminal of the secondary winding W1 of the transformer 16.

The self supply circuit 12 includes another secondary winding W2b, which provides the voltage at its terminals to a diode D1 in series with a resistance R1 and then to a capacitor Cvcc, to whose terminals the supply voltage Vcc will be available. The voltage Vcc is used for the supply of the control circuit 11 and of all the other circuits, not shown, necessary for the operation and the control of the switching power supply.

The starting circuit 13, in this case, is constituted by a simple resistance Rs connected between the cold terminal of the primary winding W1 and Vcc. The voltage present on the cold terminal of the primary winding W1 is denominated Vin.

At the starting of the switching power supply, the capacitor Cvcc is charged by the starting circuit 13 as the voltage is not yet present on the secondaries of the transformer 16. At the increasing of the voltage on the terminals of the capacitor Cvcc, all the circuits of the switching power supply are activated and the circuits are supplied by the voltage Vcc provided by the self supply circuit 12.

The use of a simple resistance as starting circuit 13 simplifies notably the circuit but being always active it consumes a great amount of current. Therefore solutions having a reduced consumption have been found as for instance that shown in FIG. 2, where the components similar to those of FIG. 1 have the same numerical references.

Figure 2:
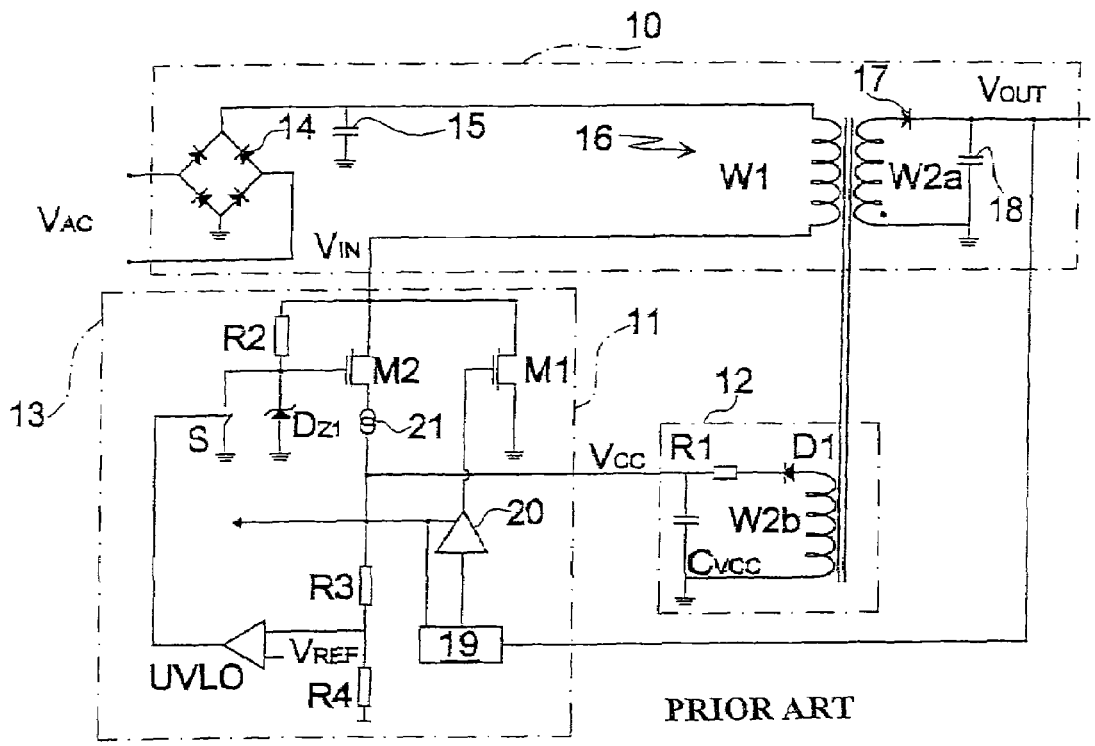
FIG. 2 shows a block scheme of a switching power supply comprising a starting circuit according to a second embodiment of the known art.

In FIG. 2 the starting circuit 13 is more complex and active. It includes a transistor M2 having the drain connected to the voltage Vcc and the source to a current generator 21 that provides the current to the capacitor Cvcc. On the gate of the transistor M2, a reference voltage produced by a resistance R2 placed in series with a zener diode DZ1 is applied, they are connected between the voltage Vin and ground. In parallel to the zener diode DZ1 there is a controlled switch S. A voltage divider composed by the resistances R3 and R4 is connected between the voltage Vcc and ground. The voltage picked in the connection node between the resistance R3 and the resistance R4 is applied to an input of the comparator UVLO, at the other comparator input a reference voltage Vref is applied. The output of the comparator UVLO controls the controlled switch S.

In this case, at the starting of the switching power supply, the capacitor Cvcc is charged through the starting circuit 13, the transistor M2 being active (because supplied by the voltage Vin). When the voltage Vcc overcomes a preset value, or when the voltage provided by the voltage divider R3 and R4 overcomes the voltage reference Vref, the controlled switch S is closed and stops the passage of current between Vin and the circuits of the switching power supply. At this point the voltage Vcc is enough to supply the circuits of the switching power supply, and it is eliminated or at least it reduces the current consumption due to the starting circuit 13.

To be noted at this point that the voltage at the terminals of the secondary winding W2b is a squared wave Vsq that, filtered by the circuit D1, R1, Cvcc, is changed into a continuous voltage Vcc that is the voltage supply of the integrated. The parasitic inductance associated to the primary winding provokes some impulses during the switching transient for which the voltage VSQ is not a perfect squared wave but it has some impulses whose amplitude increases at the increasing of the load in output.

The voltage Vcc, obtained by filtering the voltage Vsq, could exceed the maximum value applicable and the system would be switched off by the circuit OVP (Over Voltage Protection), not shown.

The self supply circuit 12 is in fact a peak detector and it detects the voltage impulses of Vsq.

The resistance R1 is used to clip the impulses Vsq in order to minimize the effects and it resolves the problem when the load is high, but, when the load is low, it becomes a drawback because, in this case, the voltage Vsq shows some rounded edges and Vcc can result of a lower value than the minimum applicable with consequent turning off of the system.

To that a light dependence with the input voltage is to be added, that can vary of a factor greater than to 3:1 in systems with universal supply.

The voltage value Vcc can be very different according to the operational conditions but however it has to be comprised between the minimum turning off voltage and the maximum voltage admissible.

Therefore it is necessary to experimentally find the excellent value of R1, that allows to satisfy both the aforesaid conditions, and this sometimes results not to be possible so that it is necessary to modify the secondary winding W2b.

Figure 3:
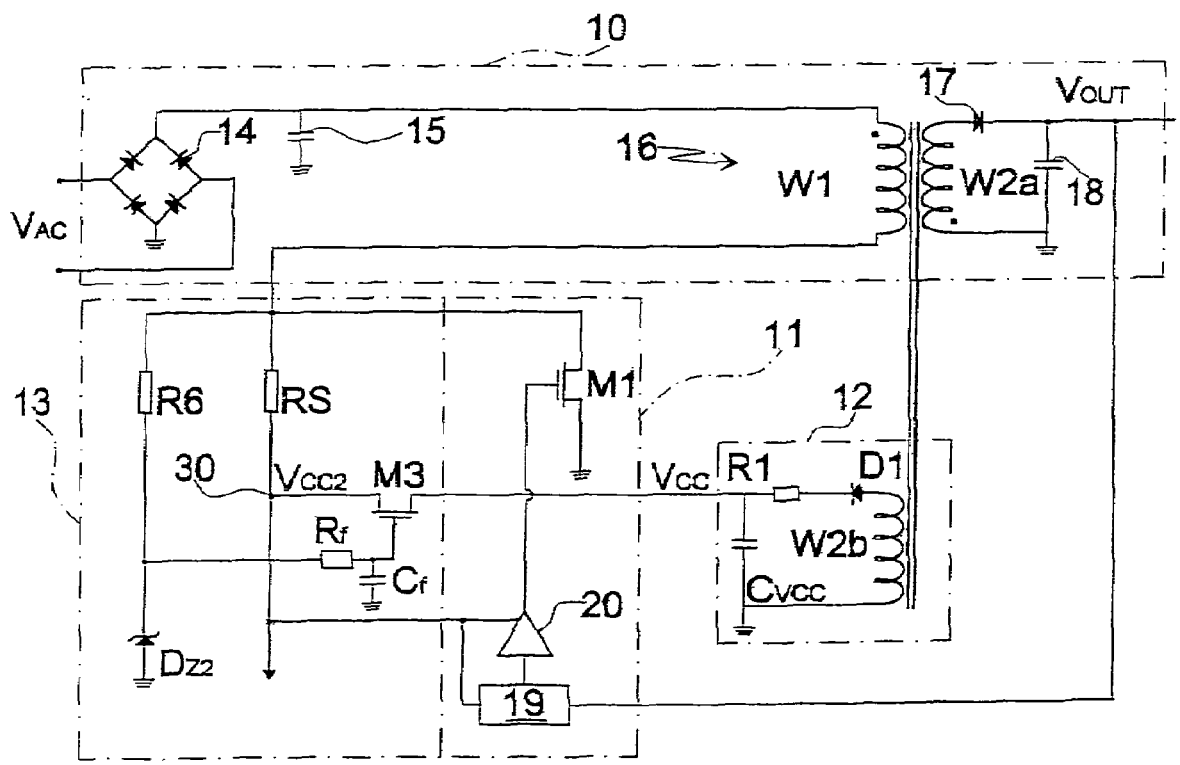
FIG. 3 shows a block scheme of a switching power supply comprising a starting circuit according to a first embodiment of the present invention.

We now refer to FIG. 3 that shows a block scheme of a switching power supply comprising a starting circuit according to a first embodiment of the present invention.

This Figure is similar to FIG. 1, where the components similar to those of FIG. 1 have the same numerical references.

In this Figure a transistor M3 has been inserted between the terminal of Vcc and the terminal 30 that is the terminal to which the resistance Rs is connected and is also that on which the voltage Vcc2, that supplies all the circuits of the switching power supply, is available. Particularly the transistor M3 has the drain connected to the terminal Vcc and the source to the terminal 30. A reference voltage is produced by a resistance R6 placed in series to a zener diode DZ2, connected between the voltage Vin and ground. This reference voltage goes through preferably a low pass filter constituted by a resistance Rf and by a capacitor Cf and then is applied to the gate of the transistor M3.

At the starting of the switching power supply the capacitor Cvcc is charged by the resistance Rs, as the transistor M3 is in conduction and its symmetrical structure allows that it operates in the third quadrant, that is the drain behaves as a source and vice versa.

When the voltage Vcc increases, the transistor M3 works in the first quadrant, with the drain connected to the terminal VCC and the source connected to the terminal 30, and it supplies all the circuits of the integrated circuit. The gate of the transistor M3 is connected to the cathode of the diode DZ2 so that the supply voltage of Vcc2 of the internal circuits of the integrated circuit will be equal to the breakdown voltage of the zener diode DZ2 less the gate-source voltage of the transistor M3 and it will be independent from the voltage VCC, voltage that can increase up to the breakdown value of the transistor M3. Any limit on Vcc is so eliminated consequent to the voltage limitation of the transistors source.

The filter composed by the resistance Rf and by the capacitor Cf are used to sustain the transistor M3 gate voltage when at every switching cycle the voltage Vin is brought to ground by the transistor M1.

Figure 4:
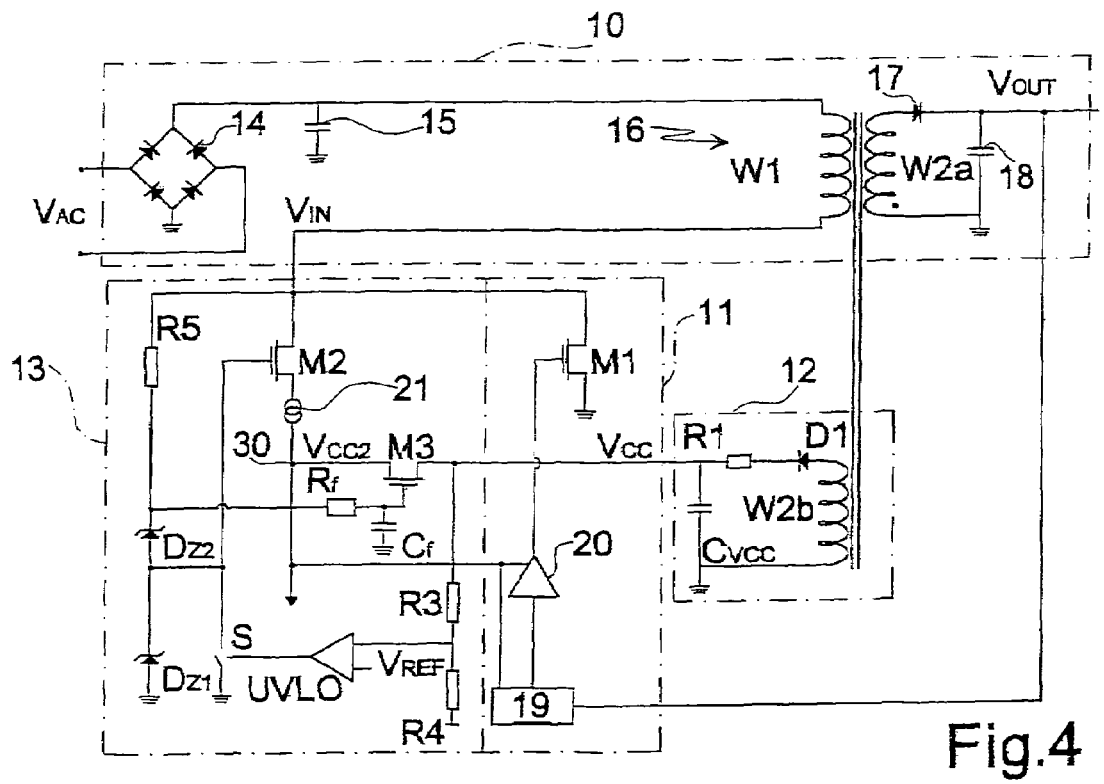
FIG. 4 shows a block scheme of a switching power supply comprising a starting circuit according to a second embodiment of the present invention.

The transistor M3 can sustain high voltages between the drain and the source while the electric circuits of the integrated circuit sustain medium—low voltages limited by the zener diode Dz2 and by the transistor M3. We refer now to FIG. 4 that shows a block scheme of a switching power supply comprising a starting circuit according to a second embodiment of the present invention.

This Figure is similar to FIG. 2, where components similar, to those of FIG. 2 have the same numerical references.

Also in this case a transistor M3 has been inserted between the terminal of Vcc and the terminal 30 that is the terminal to which the current generator 21 is connected and is also that on which there is available the voltage Vcc2 that supplies all the circuits of the switching power supply. Particularly the transistor M3 has the drain connected to the terminal Vcc and the source to the terminal 30. A reference voltage is produced by a resistance R5 placed in series with a zener diode DZ2 and then with a zener diode DZ1, connected between the voltage Vin and ground. The reference voltage, available on the terminals of the diode DZ2, preferably goes trough a low pass filter constituted by a resistance Rf and by a capacitor Cf and then it is applied to the transistor gate M3.

The connection node between the diodes DZ2 and DZ1 is connected to the transistor M2 gate. In parallel to the diode DZ1 the controlled switch S, controlled by the comparator UVLO, is placed.

At the increasing of the voltage Vcc, the controlled switch S is closed and it short-circuits the diode DZ1, interrupting the current flow through the transistor M2, and the voltage regulator composed by the transistor M3, by the diode DZ2 and preferably by the filter composed by Rf and Cf starts to work.

Preferably, the control circuit 11, the starting circuit 13 and eventually other necessary circuits for the operation and the control of the switching power supply (not shown) are contained in one integrated circuit. It is so obtained an integrated circuit, using a standard type technology (for instance able to sustain a voltage between the source/body and the substrate of around 20 Vs) able to sustain a very high voltage Vcc (between drain and ground), greater than 40 V, more preferably greater than 80 V, and even more preferably greater than 160 V (for instance equal to the breakdown voltage of about 700 Vs).

What is claimed is:

1. A starting circuit for switching power supplies, comprising:
   a first terminal, a second terminal, and a third terminal that supplies voltage to circuits of a switching power supply;
   a first supply voltage coming from the first terminal;
   a second supply voltage coming from the second terminal;
   a first current path between the first terminal and the third terminal;
   a second current path between the first terminal and the second terminal;
   a third current path between the second terminal and the third terminal; and
   a two-way voltage regulator placed along the second current path, wherein the two-way voltage regulator comprises a transistor with one terminal coupled to the first supply voltage and another terminal coupled to the second supply voltage, which, in a first operation mode allows current to flow from the first supply voltage to the second supply voltage and, in a second operation mode allows current to flow from the second supply voltage to the third terminal of the starting circuit.

2. The starting circuit according to claim 1, wherein the two-way voltage regulator comprises a voltage limiting circuit supplied by the first supply voltage.

3. The starting circuit according to claim 1, wherein the two-way voltage regulator comprises a preset voltage generator coupled to the transistor gate.

4. The starting circuit according to claim 1, wherein the two-way voltage regulator comprises a capacitor coupled to the transistor gate.

5. The starting circuit according to claim 1, wherein the first current path comprises a resistance.

6. The starting circuit according to claim 1, wherein the first current path comprises a controlled switch.

7. The starting circuit according to claim 6, wherein the controlled switch is closed when the second supply voltage is lower than a preset reference voltage value and it is open when the second supply voltage is higher than the preset reference value.

8. A switching power supply comprising:
   a control circuit for the switching power supply; and
   a starting circuit of the control circuit, the starting circuit comprising:
      a first terminal, a second terminal, and a third terminal that supplies voltage to circuits of the switching power supply;
      a first supply voltage coming from the first terminal;
      a second supply voltage coming from the second terminal
      a first current path between the first terminal and the third terminal;
      a second current path between the first terminal and the second terminal;
      a third current path between the second terminal and the third terminal; and
      a two-way voltage regulator placed along the second current path, wherein the two-way voltage regulator comprises a transistor with one terminal coupled to the first supply voltage and another terminal coupled to the second supply voltage, which, in a first operation mode allows current to flow from the first supply voltage to the second supply voltage and, in a second operation mode allows current to flow from the second supply voltage to the third terminal of the starting circuit.

9. An integrated circuit for a switching power supply, the integrated circuit comprising:
   a control circuit for the switching power supply; and
   a starting circuit able to sustain a self supply voltage greater than 40 V, the starting circuit comprising:
      a first terminal, a second terminal, and a third terminal that supplies voltage to circuits of the switching power supply;
      a first supply voltage coming from the first terminal;
      a second supply voltage coming from the second terminal;
      a first current path between the first terminal and the third terminal;
      a second current path between the first terminal and the second terminal;
      a third current path between the second terminal and the third terminal; and
      a two-way voltage regulator placed along the second current path, wherein the two-way voltage regulator comprises a transistor with one terminal coupled to the first supply voltage and another terminal coupled to the second supply voltage, which, in a first operation mode allows current to flow from the first supply voltage to the second supply voltage and, in a second operation mode allows current to flow from the second supply voltage to the third terminal of the starting circuit.

* * * * *